United States Patent Office 3,128,290
Patented Apr. 7, 1964

3,128,290
5,19-CYCLO-Δ⁶-CYCLOPENTANOPHENANTHRENE DERIVATIVES
Albert Bowers and Otto Halpern, Mexico City, Mexico, assignors to Syntex Corporation, Panama, Panama, a corporation of Panama
No Drawing. Filed Sept. 5, 1962, Ser. No. 221,430
20 Claims. (Cl. 260—397.3)

The present invention relates to novel cyclopentanophenanthrene derivatives and to a process for the production thereof.

More particularly the present invention relates to novel 5,19-cyclo-Δ⁶-androstene and 5,19-cyclo-Δ⁶-pregnene derivatives.

The novel compounds of the present invention are represented by the following formulae:

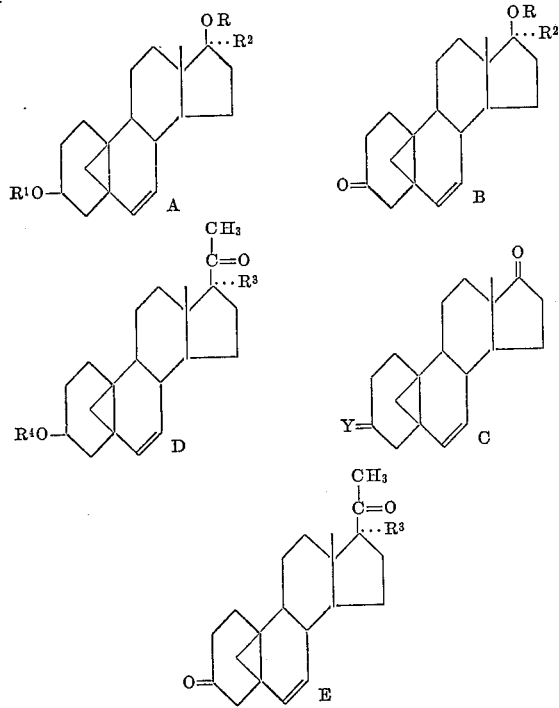

In the above formulae R, R¹ and R⁴ each represents a hydrogen or a hydrocarbon carboxylic acyl group of less than 12 carbon atoms; R² represents hydrogen, lower alkyl, lower alkenyl or lower alkinyl; R³ represents hydrogen, a hydroxyl group or a hydrocarbon carboxylic acyloxy group of less than 12 carbon atoms; and Y represents a β-hydroxyl group, a β-hydrocarbon carboxylic acyloxy group of less than 12 carbon atoms or a keto group.

The acyl and acyloxy groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by the above Formula A, B and C have anabolic-androgenic properties, inhibit the production of pituitary gonadotrophic hormones and ACTH. In addition they exhibit anti-estrogenic activity and lower the cholesterol levels in blood, liver and adrenals. Furthermore, they are useful in the control of fertility and psychotic conditions and as appetite stimulants.

The compounds represented by Formulae D and E are powerful progestational agents with good oral activity. In addition they have anti-androgenic, anti-gonadotrophic and anti-estrogenic properties and are very useful in fertility control. Furthermore, they may be used in the treatment of premenstrual tension and exhibit blood cholesterol lowering and diuretic activities. When applied topically, these compounds are very useful in the treatment of acne.

The novel androstene compounds of the present invention are prepared by the process illustrated by the following equation.

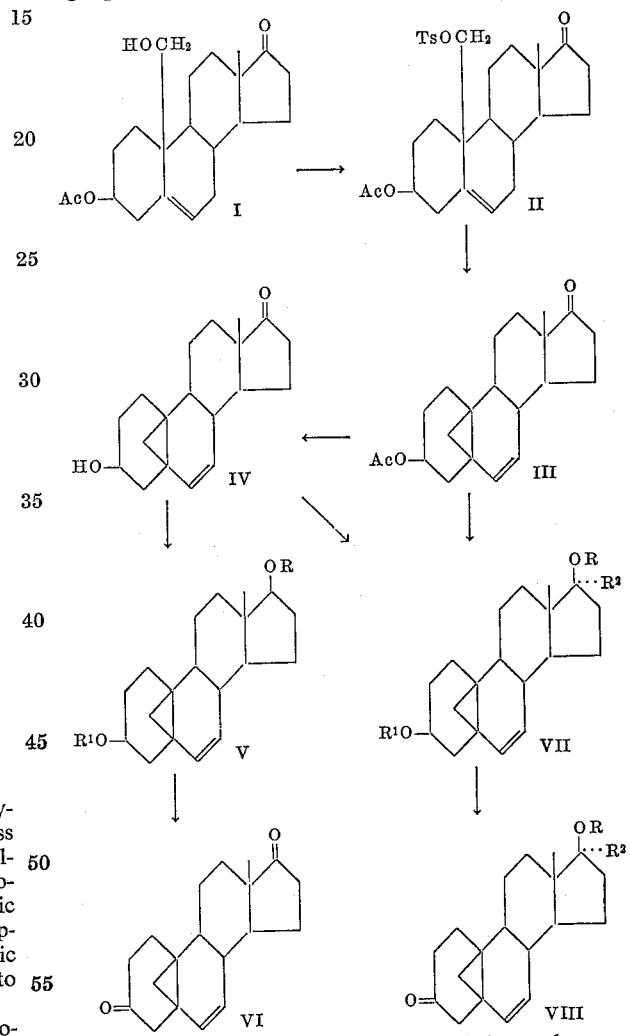

In the above formula R, R¹, and R² have the same meaning as previously defined. Ac represents the acetyl group.

In carrying out the process just outlined, the starting Δ⁵-androstene-3β-19-diol-17-one 3-acetate (I) is treated conventionally in pyridine with tosyl chloride, thus giving Δ⁵-androstene-3β,19-diol-17 - one 3 - acetate - 19 - tosylate (II), which upon reflux in pyridine, for a period of time of the order of 16 hours, affords 5,19-cyclo-Δ⁶-androsten-3β-ol-17-one acetate (III). The acetoxy grouping of the latter compound is conventionally saponified in an alkaline medium to give the corresponding 3-free alcohol (IV), which upon reduction with a double metal hydride, such as sodium borohydride, yields 5,19-cyclo-Δ⁶-androstene-3β,17β-diol (V; R=R¹=H). The latter diol upon conventional oxidation, as per treatment with chromic acid in acetic acid, yields 5,19-cyclo-Δ⁶-androstene-3,17-dione (VI).

Treatment of 5,19-cyclo-Δ⁶-androsten-3β - ol - 17 - one (IV) with a 1-alkine, such as acetylene, in the presence of potassium t-amylate, yields the corresponding 17α-lower alkinyl-5,19-cyclo-Δ⁶-androstene-3β,17β-diol (VII; R²=1-alkinyl).

Upon treatment of 5,19-cyclo-Δ⁶-androsten-3β-ol-17-one (IV) with a (lower alkyl or lower alkenyl) magnesium halide such as methyl magnesium bromide or vinyl magnesium bromide there are obtained the corresponding 17α (lower alkyl or lower alkenyl) 5,19-cyclo-Δ⁶-androstene-3β,17β-diol (VII; R²=alkyl or 1-alkenyl).

The 17α - substituted - 5,19 - cyclo - Δ⁶ - androstene-3β,17β-diol derivatives (VII; R²≠H, R¹=H) are oxidized, preferably with chromium trioxide, to the corresponding 17α-substituted 5,19-cyclo-Δ⁶-androsten-17β-ol-3-one compounds (VIII; R²≠H).

Upon treatment of 5,19-cyclo-Δ⁶-androsten-3β-ol-17-one acetate (III) with sodium borohydride, preferably under anhydrous conditions there is obtained 5,19-cyclo-Δ⁶-androstene - 3β,17 - diol - 3 - acetate (VII; R=R²=H, R¹=acetyl) which is conventionally treated with dihydropyrane in the presence of p-toluenesulfonic acid for a period of the order of 4 days to give the corresponding 3 -acetate - 17 - tetrahydropyranylether of 5,19 - cyclo-Δ⁶-androstene 3β,17β-diol.

The latter compound is saponified conventionally in an alkaline medium to give the 17-tetrahydropyranyl-ether of 5,19-cyclo-Δ⁶-androstene-3β,17β-diol, which upon oxidation in a neutral or slightly basic medium, such as chromium trioxide in pyridine affords 17-tetrahydropyranylether of 5,19-cyclo-Δ⁶-androsten-17β-ol-3-one. The ether moiety of the latter compound is conventionally hydrolyzed in an acid medium, such as dilute hydrochloric acid in acetic acid, thus giving 5,19-cyclo-Δ⁶-androsten-17β-ol-3-one (VIII; R=R²=H).

The secondary hydroxyl groups of the compounds prepared as described heretofore are conventionally esterified in pyridine with an acylating agent, such as an anhydride of a hydrocarbon carboxylic acid of the type described hereinbefore, thus affording the corresponding ester.

The tertiary hydroxyl groups of the compounds prepared in accordance with the present invention, are conventionally acylated, in the presence of p-toluenesulfonic acid, with a suitable acylating agent such as acetic anhydride or caproic anhydride, to give the corresponding acylate.

The novel pregnane derivatives of the present invention are prepared by the process illustrated as follows:

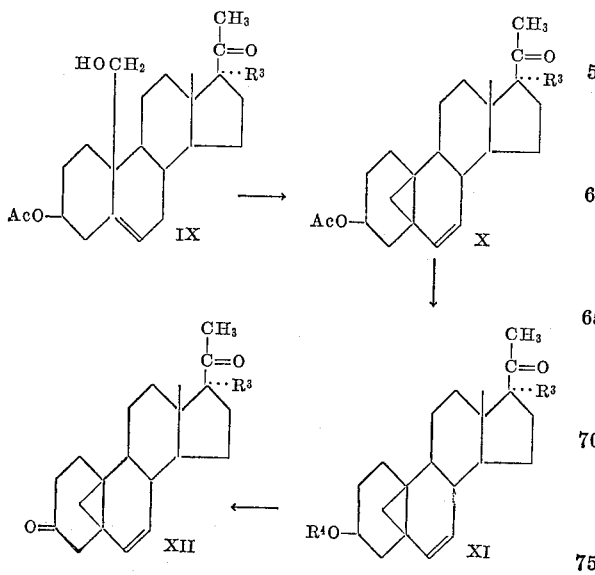

In the above formulae R₃, R₄ and Ac have the same meaning as described hereinbefore.

In practicing the process just outlined, the starting compound (IX) which is a derivative of Δ⁵-pregnene-3β,19-diol-20-one-3-acetate, is treated conventionally in pyridine with tosyl chloride to give the corresponding 19-tosylate, which upon reflux in pyridine for a period of time of the order of 16 hours, yields the corresponding 5,19-cyclo-Δ⁶-pregnene-3β-ol-21-one acetate derivative (X). Conventional saponification in a basic medium of the acetoxy grouping of the latter compound gives the corresponding 3-free-alchools (XI; R⁴=H), which upon oxidation, preferably with chromium trioxides give the corresponding 5,19-cyclo-Δ⁶-pregnene-3,20-dione derivative (XII).

The 3β-hydroxyl group of the pregnene derivatives of the present invention is conventionally esterified in pyridine with an acylating agent, such as an anhydride of the hydrocarbon carboxylic acid of the type defined before, thus affording the corresponding 3β-esters.

The tertiary 17α-hydroxyl group of the pregnene derivatives of the present invention, is conventionally acylated, in the presence of p-toluenesulfonic acid, with a suitable acylating agent, as for example, acetic anhydride or caproic anhydride, to give the corresponding 17α-acylates.

The following specific examples serve to illustrate, but are not intended to limit the scope of the present invention.

*Example I*

A solution of 5 g. of Δ⁵-androstene-3β,19-diol-17-one 3-acetate (obtained in accordance with Bowers, U.S. pat. appl. Ser. No. 194,716, filed May 14, 1962) in 25 cc. of pyridine was cooled to 0° C. Under stirring there was added 1.3 g. of tosyl chloride, the mixture was kept at 0° C. for 16 hours, diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained Δ⁵-androstene-3β,19-diol-17-one 3-acetate-19-tosylate.

4 g. of the latter compound were refluxed for 16 hours in 80 cc. of pyridine. The resulting solution was poured into water and extracted with ethyl acetate. The extract was washed with 2 N aqueous hydrochloric acid, then successively with water, aqueous bicarbonate solution and water. The moist extract was then dried over anhydrous sodium sulfate and evaporated to dryness. Crystallization from acetone-hexane afforded 5,19-cyclo-Δ⁶-androsten-3β-ol-17-one acetate.

*Example II*

A suspension of 1 g. of the latter compound in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 5,19-cyclo-Δ⁶-androsten-3β-ol-17-one.

*Example III*

A solution of 1 g. of sodium borohydride in 3 cc. of water was added to an ice-cooled solution of 1 g. of the latter 17-ketone in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 5,19-cyclo-Δ⁶-androstene-3β,17β-diol.

*Example IV*

A solution of 1 g. of 5,19-cyclo-Δ⁶-androsten-3β-ol-17-one in 30 cc. of anhydrous benzene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave in the hexane-benzene (2:3) fractions a product, which upon recrystallization from acetone-hexane afforded 17α-ethinyl-5,19-cyclo-$\Delta^6$-androstene-3β,17β-diol.

Example V

A solution of 5 g. of 5,19-cyclo-$\Delta^6$-androsten-3β-ol-17-one in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 17α - methyl-5,19-cyclo-$\Delta^6$-androstene-3β,17β-diol.

Example VI

Following the procedure described in Example V, but substituting methyl magnesium bromide by vinyl magnesium bromide, there was obtained 17α-vinyl-5,19-cyclo-$\Delta^6$-androstene-3β-17β-diol.

Example VII

A solution of 1.1 equivalents of chromic acid in 5 cc. of 80% acetic acid was added dropwise to a stirred solution of 1 g. of 17α-ethinyl-5,19-cyclo-$\Delta^6$-androstene-3β,17β-diol in 10 cc. of glacial acetic acid, while the temperature was maintained around 20° C. After 2 hours at room temperature, the mixture was poured into ice water and the formed precipitate collected, washed with water and recrystallized from methanol, thus giving 17α-ethinyl-5,19-cyclo-$\Delta^6$-androsten-17β-ol-3-one, 17α-methyl - 5,19-cyclo-$\Delta^6$-androstene-3β,17β-diol, 17α-vinyl - 5,19-cyclo-$\Delta^6$-androstene-3β,17β - diol, 17α-vinyl- 5,19-cyclo-$\Delta^6$ - androstene-3β,17β-diol and 5,19-cyclo-$\Delta^6$-androstene-3β,17β-diol were treated following the above procedure, thus affording respectively: 17α-methyl-5,19-cyclo-$\Delta^6$-androsten-17β-ol-3-one, 17α-vinyl-5,19-cyclo-$\Delta^6$-androsten-17β-ol-3-one and 5,19-cyclo-$\Delta^6$-androstene-3,17-dione.

Example VIII

A solution of 2 g. of sodium borohydride in 30 cc. of methanol was added with stirring to a solution of 2 g. of 5,19-cyclo-$\Delta^6$-androsten-3β-ol-17-one acetate in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave 5,19-cyclo-$\Delta^6$-androstene-3β,17β-diol 3-acetate.

Example IX 2 cc. of dihydropyrane were added to a solution of 1 g. of the latter steroid in 15 cc. of benzene and about 1 cc. was distilled to remove moisture. 0.4 g. of p-toluenesulfonic acid were added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded the 3-acetate-17-tetrahydropyranylether of 5,19-cyclo-$\Delta^6$-androstene-3β,17β-diol.

Example X

The latter compound was treated in accordance with Example II thus giving the 17-tetrahydropyranylether of 5,19-cyclo-$\Delta^6$-androstene-3β,17β-diol.

Example XI

A solution of 6 g. of the last named diol in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded the 17-tetrahydropyranylether of 5,19 - cyclo-$\Delta^6$-androsten-17β-ol-3-one.

Example XII

To a solution of 1 g. of the latter ether in 30 cc. of acetic acid was added 0.5 cc. of 2 N hydrochloric acid. After 5 hours at room temperature, ice water was added and the product extracted with methylene chloride. The extract was washed to neutral, dried over anhydrous sodium sulfate and evaporated to dryness. Crystallization from acetone-hexane yielded 5,19-cyclo-$\Delta^6$-androsten-17β-ol-3-one.

Example XIII

A mixture of 1 g. of 5,19-cyclo-$\Delta^6$-androsten-17β-ol-3-one 4 cc. of pyridine and 2 cc. of acetic anhydride was kept at room temperature overnight, poured into ice water, the formed precipitate was filtered, washed with water and dried. Crystallization from acetone-hexane gave 5,19-cyclo-$\Delta^6$-androsten-17β-ol-3-one acetate.

Following exactly the same procedure, there were treated 5,19-cyclo-$\Delta^6$-androstene-3β,17β-diol, 17α-ethinyl-5,19-cyclo-$\Delta^6$-androstene-3β,17β-diol, 17α - methyl-5,19-cyclo-$\Delta^6$-androstene-3β,17β-diol and 17α-vinyl-5,19-cyclo-$\Delta^6$-androstene-3β,17β - diol, thus affording respectively: 5,19-cyclo-$\Delta^6$-androstene-3β,17β-diol diacetate, 17α - ethinyl-5,19-cyclo-$\Delta^6$-androstene-3β,17β - diol 3-acetate, 17α-methyl-5,19-cyclo-$\Delta^6$-androstene - 3β,17β - diol 3-acetate, and 17α-vinyl-5,19-cyclo-$\Delta^6$-androstene-3β,17β-diol 3-acetate.

Example XIV

The starting compounds of the preceding example were treated in accordance with that example, except that acetic anhydride was substituted by propionic anhydride, caproic anhydride and enanthic anhydride thus affording respectively the corresponding propionates, caproates and enanthates.

Example XV

To a solution of 5 g. of 17α-ethinyl-5,19-cyclo-$\Delta^6$-androstene-17β-ol-3-one in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 17α-ethinyl-5,19-cyclo-$\Delta^6$-androstene-17β-ol-3-one caproate.

Following exactly the same procedures there were treated the starting compounds listed under I, thus affording the products set forth under II.

| I | II |
|---|---|
| 17α-methyl-5,19-cyclo-$\Delta^6$-androstene-17β-ol-3-one. | 17α-methyl-5,19-cyclo-$\Delta^6$-androstene-17β-ol-3-one caproate. |
| 17α-vinyl-5,19-cyclo-$\Delta^6$-androstene-17β-ol-3-one. | 17α-vinyl-5,19-cyclo-$\Delta^6$-androstene-17β-ol-3-one caproate. |
| 17α-ethinyl-5,19-cyclo-$\Delta^6$-androstene-3β,17β-diol 3-acetate. | 17α-ethinyl-5,19-cyclo-$\Delta^6$-androstene-3β,17β-diol 3-acetate-17-caproate. |
| 17α-methyl-5,19-cyclo-$\Delta^6$-androstene-3,17β-diol 3-acetate. | 17α-methyl-5,19-cyclo-$\Delta^6$-androstene-3β,17β-diol 3-acetate-17-caproate. |
| 17α-vinyl-5,19-cyclo-$\Delta^6$-androstene-3β,17β-diol 3-acetate. | 17α-vinyl-5,19-cyclo-$\Delta^6$-androstene-3β,17β-diol 3-acetate-17-caproate. |

Example XVI

The 3-acetate of Δ⁵-pregnene-3β,19-diol-20-one (obtained in accordance with the aforesaid patent application) was treated successively in accordance with Examples I and II, thus yielding respectively 5,19-cyclo-Δ⁶-pregnen-3β-ol-20-one acetate, and 5,19-cyclo-Δ⁶-pregnen-3β-ol-20-one.

Example XVII 5,19-cyclo-Δ⁶-pregnen-3β-ol-20-one was treated in accordance with Example VII, thus affording 5,19-cyclo-Δ⁶-pregnene-3,20-dione.

Example XVIII

The 3,17-diacetate of Δ⁵-pregnene-3β-17α,19-triol-20-one (obtained in accordance with the aforesaid pat. application) was treated following the procedure described in Example I, thus giving the diacetate of 5,19-cyclo-Δ⁶-pregnene-3β,17α-diol-20-one.

Example XIX

The latter compound was treated according to Example II to give the 17-acetate of 5,19-cyclo-Δ⁶-pregnene-3β,17α-diol-20-one.

Example XX

A solution of 0.17 g. of potassium hydroxide in 0.2 cc. of water and 2.5 cc. of methanol was added over 30 minutes to a boiling solution of 1 g. of 17-acetate of 5,19-cyclo-Δ⁶-pregnene-3β,17α-diol-20-one in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 5,19-cyclo-Δ⁶-pregnene-3β,17α-diol-20-one.

Example XXI

The 17-acetate of 5,19-cyclo-Δ⁶-pregnene-3β,17α-diol-20-one and 5,19-cyclo-Δ⁶-pregnene-3β-17α-diol-20-one were treated in accordance with Example VII thus furnishing respectively: the acetate of 5,19-cyclo-Δ⁶-pregnen-17a-ol-3,20-dione and 5,19-cyclo-Δ⁶-pregnen-17α-ol-3,20-dione.

Example XXII

The 17-acetate of 5,10-cyclo-Δ⁶-pregnene-3β,17α-diol-20-one was treated following the procedure described in Example XIII except that acetic anhydride was substituted by enanthic anhydride, thus furnishing the 3-enanthate-17-acetate of 5,19-cyclo-Δ⁶-pregnene-3β,17α-diol-20-one.

Example XXIII 5,19-cyclo - Δ⁶ - pregnene-3β,17α-diol-20-one and 5,19-cyclo-Δ⁶-pregnene-17α-ol-3,20-dione were treated in accordance with Example XV thus giving respectively: 5,19-cyclo - Δ⁶ -pregnene- 3 β,17α-diol-20-one dicaproate, and 5,19-cyclo-Δ⁶-pregnene-17α-ol-3,20-dione caproate.

Example XXVI 5,19-cyclo-Δ⁶-pregnene-3β,17α-diol-20-one was treated in accordance with Example XIII thus yielding 5,19-cyclo-Δ⁶-pregene-3β,17α-diol-201-one 3-acetate.

We claim:

1. A compound of the following formula:

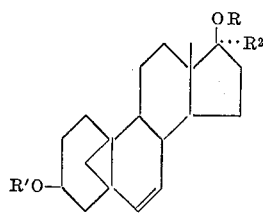

wherein R and R¹ are selected from the group consisting of hydrogen and a hydrocarbon carboxylic acyl group of less than 12 carbon atoms; and $R_2$ is a member of the group consisting of hydrogen, lower alkyl, lower alkenyl, and lower alkinyl.

2. 5,19-cyclo-Δ⁶-androstene-3β-17β-diol.
3. 17α-ethinyl-5,19-cyclo-Δ⁶-androstene-3β,17-diol.
4. 17α-methyl-5,19-cyclo-Δ⁶-androstene-3β,17β-diol.
5. 17α-vinyl-5,19-cyclo-Δ⁶-androsetene-3β,17β-diol.
6. A compound of the following formula:

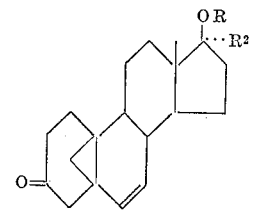

wherein R is selected from the group consisting of hydrogen and a hydrocarbon carboxylic acyl group of less than 12 carbon atoms; and R² is a member of the group consisting of hydrogen, lower alkyl, lower alkenyl and lower alkinyl.

7. 17α-ethinyl-5,19-cyclo-Δ⁶-androsten-17β-ol-3-one.
8. 17α-methyl-5,19-cyclo-Δ⁶-androsten-17β-ol-3-one.
9. 17α-vinyl-5,19-cyclo-Δ⁶-androsten-17β-ol-3-one.
10. A compound of the following formula:

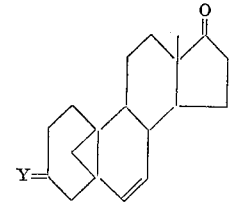

wherein Y is selected from the group consisting of a β-hydroxyl group, a β-hydrocarbon carboxylic acyloxy group of less than 12 carbon atoms and a keto group.

11. 5,19-cyclo-Δ⁶-androsten-3β-ol-17-one.
12. 5,19-cyclo-Δ⁶-androsten-3β-ol-17-one acetate.
13. 5,19-cyclo-Δ⁶-androstene-3,17-dione.
14. A compound of the following formula:

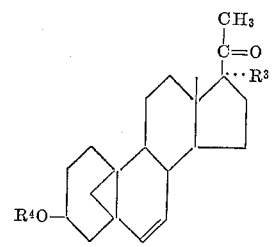

wherein $R_3$ is selected from the group consisting of hydrogen, a hydroxyl group and a hydrocarbon carboxylic acyloxy group of less than 12 carbon atoms; and $R_4$ is selected from the group consisting of hydrogen and a hydrocarbon carboxylic acyl group of less than 12 carbon atoms.

15. 5,19-cyclo-Δ⁶-pregnen-3β-ol-20-one.
16. 5,19-cyclo-Δ⁶-pregnene-3β,17α-diol-20-one.
17. The diacetate of 5,9-cyclo-Δ⁶-pregnene-3β,17α diol-20-one.

18. A compound of the following formula:
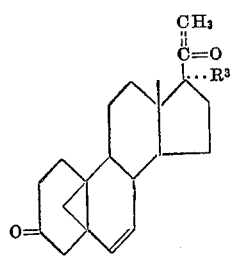
wherein $R_3$ is selected from the group consisting of hydrogen, a hydroxyl group and a hydrocarbon carboxylic acyloxy group of less than 12 carbon atoms.
19. 5,19-cyclo-$\Delta^6$-pregnene-3,20-dione.
20. 5,19-cyclo-$\Delta^6$-pregnen-17$\alpha$-ol-3,20-dione.
No references cited.

UNITED STATES PATENT OFFICE
CERTIFICATE OF CORRECTION

Patent No. 3,128,290                                          April 7, 1964

Albert Bowers et al.

It is hereby certified that error appears in the above numbered patent requiring correction and that the said Letters Patent should read as corrected below.

Column 9, the formula in claim 18 should appear as shown below instead of as in the patent:

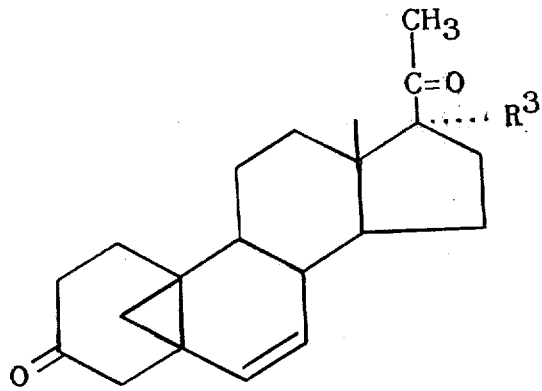

Signed and sealed this 28th day of July 1964.

(SEAL)
Attest:

ESTON G. JOHNSON
Attesting Officer

EDWARD J. BRENNER
Commissioner of Patents